(12) United States Patent
Tokutsu

(10) Patent No.: US 8,503,048 B2
(45) Date of Patent: Aug. 6, 2013

(54) AUTO DOCUMENT FEEDING DEVICE AND IMAGE SCANNING DEVICE

(75) Inventor: Akihito Tokutsu, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 382 days.

(21) Appl. No.: 13/009,589

(22) Filed: Jan. 19, 2011

(65) Prior Publication Data

US 2011/0181926 A1 Jul. 28, 2011

Related U.S. Application Data

(60) Provisional application No. 61/298,322, filed on Jan. 26, 2010.

(51) Int. Cl.
*H04N 1/04* (2006.01)

(52) U.S. Cl.
USPC .......................................... 358/498; 358/488

(58) Field of Classification Search
None
See application file for complete search history.

(56) References Cited

U.S. PATENT DOCUMENTS

| 2004/0217541 A1* | 11/2004 | Horio ............................. 271/121 |
| 2005/0157357 A1* | 7/2005 | Yamanaka ..................... 358/498 |
| 2010/0014902 A1 | 1/2010 | Tokutsu et al. |

* cited by examiner

*Primary Examiner* — Douglas Tran
(74) *Attorney, Agent, or Firm* — Patterson & Sheridan, L.L.P.

(57) ABSTRACT

According to one embodiment, an auto document feeding device comprises: a document placing section on which documents are placed; a first gate configured to divert the documents in a first direction or a second direction; a first conveying unit or a second conveying unit configured to lead the documents to the image scanning unit; a paper discharging and conveying unit configured to lead the documents from the image scanning unit in the direction of the paper discharge tray; a reversing roller configured to switch back the documents passed through the paper discharging and conveying unit; a reversing and conveying unit configured to convey the documents from the reversing roller to the first gate; and a second gate configured to divert the documents passed through the paper discharging and conveying unit to the reversing and conveying unit.

23 Claims, 16 Drawing Sheets

AUTO DOCUMENT FEEDING DEVICE AND IMAGE SCANNING DEVICE

CROSS-REFERENCE TO RELATED APPLICATION

This application is based upon and claims the benefit of priority from Provisional U.S. Application 61/298,322 filed on Jan. 26, 2010, the entire contents of which are incorporated herein by reference.

FIELD

Embodiments described herein relate to an auto document feeding device that conveys a document to an image scanning device used in an image forming apparatus or the like.

BACKGROUND

As an image scanning device that automatically feeds a document and scans an image on the document, there is an apparatus that conveys a document to a scanning device through plural conveying paths and scans the document at high speed. Further, as an image scanning device comprising plural conveying paths, there is an apparatus comprising two scanning devices on the conveying paths for both-side scanning at high speed. In the apparatus comprising the two scanning devices, a scanning device configured to scan a front side of a document and a scanning device configured to scan a rear side of the document are arranged along one conveying path to scan both the sides of the document when the document is conveyed once.

When the two scanning devices are comprised in the image scanning device, since the scanning devices are relatively expensive, it is likely that a reduction in cost is hindered.

There is a demand for development of a low-price image scanning device that realizes an increase in image scanning speed even in both-side scanning, efficiently performs document scanning, and has high productivity of document image scanning.

DETAILED DESCRIPTION

According to one embodiment, an auto document feeding device comprises: a document placing section on which documents are placed; a first gate configured to divert the documents in a first direction or a second direction; a first conveying unit configured to lead the documents diverted in the first direction to an image scanning unit; a second conveying unit configured to lead the documents diverted in the second direction to the image scanning unit; a paper discharge tray configured to collect the documents passed through the image scanning unit; a paper discharging and conveying unit configured to lead the documents from the image scanning unit in the direction of the paper discharge tray; a reversing roller configured to switch back the documents passed through the paper discharging and conveying unit; a reversing and conveying unit configured to convey the documents from the reversing roller to the first gate; and a second gate configured to divert the documents passed through the paper discharging and conveying unit to the reversing and conveying unit.

An embodiment is explained below.

Figure 1:
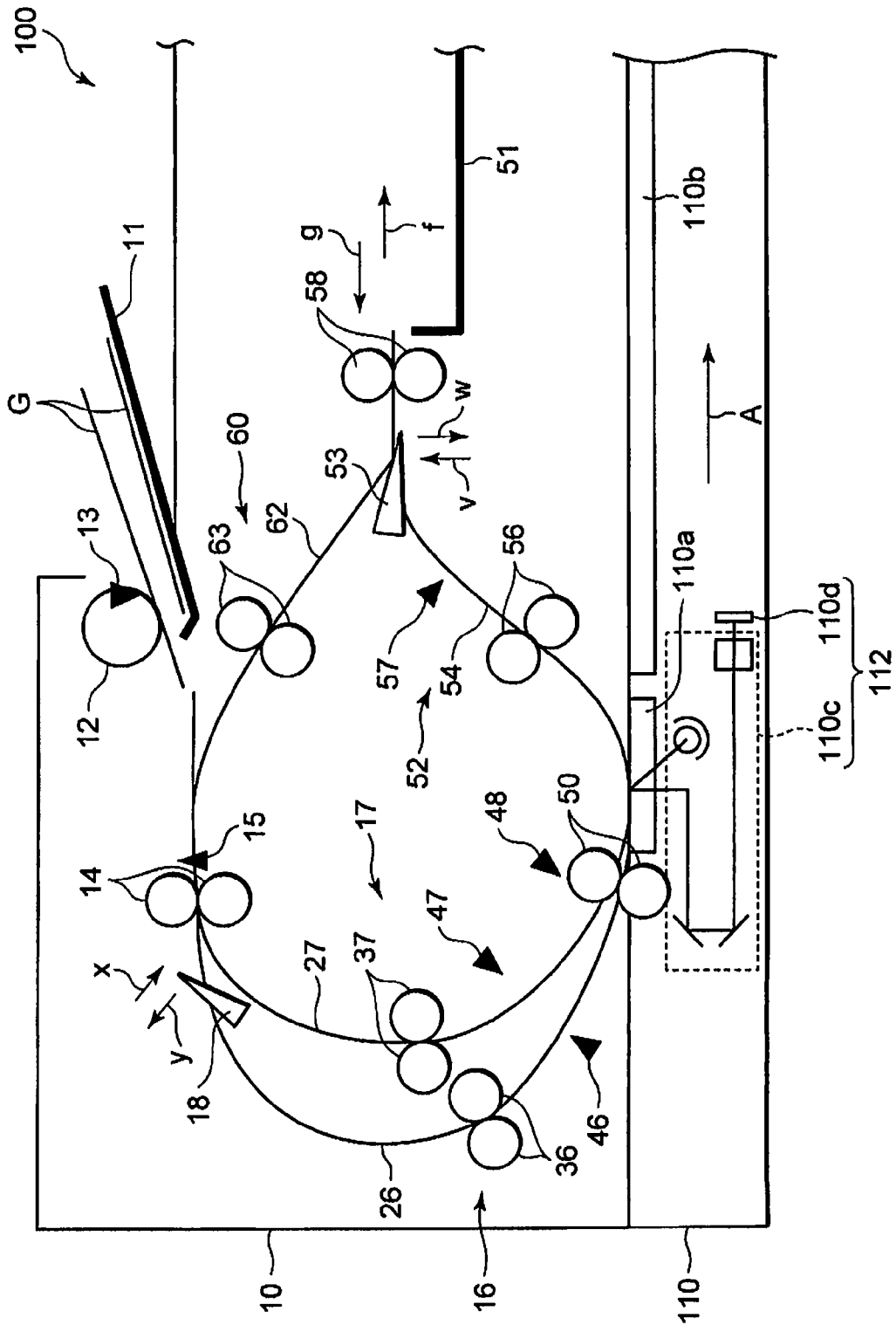
FIG. 1 is a schematic diagram of a main part of an image scanning device according to an embodiment.

FIG. 1 is a main part of an image scanning device 100 according to the embodiment. The image scanning device 100 comprises a scanner 110 and an auto document feeder (ADF) 10 configured to convey a document G to the scanner 110. The scanner 110 comprises READ document glass 110*a* and platen glass 110*b*. The scanner 110 further comprises a scanning device 112, which is an image scanning unit. The scanning device 112 comprises an optical mechanism 110*c* and a CCD (Charge Coupled Device) 110*d*.

The optical mechanism 110*c* optically scans an image of the document G traveling on the READ document glass 110*a*. Alternatively, the optical mechanism 110*c* is moved in an arrow A direction by not-shown driving means along the platen glass 110*b* and optically scans an image of a document placed on the platen glass 110*b*. The CCD 110*d* photoelectrically converts a light signal from the optical mechanism 110*c* into an electric signal.

The ADF 10 comprises a document tray 11, which is a document placing section, a feed and pickup roller 12 configured to pick up the document G from the document tray 11 and feed the document G, and a registration roller pair 14 configured to align the leading end of the document G picked up from the document tray 11 and fed. The ADF 10 comprises, above the document tray 11, an empty sensor 13 configured to detect presence or absence of the document G. The ADF 10 further comprises a registration sensor (RGT sensor) 15 configured to detect arrival of the document G at the registration roller pair 14.

The ADF 10 comprises an entrance gate 18, which is a first gate, configured to divert the document G, which is supplied from the registration roller pair 14, to a first conveying unit 16 or a second conveying unit 17. The first conveying unit 16 comprises an OUT path 26 that reaches from the gate to a pre-scanning roller pair 50, an OUT roller pair 36 configured to convey the document G in the OUT path 26, and an OUT sensor 46 configured to detect the document G. The second conveying unit 17 comprises an IN path 27 that reaches from the gate to the pre-scanning roller pair 50, an IN roller pair 37 configured to convey the document G in the IN path 27, and an IN sensor 47 configured to detect the document G.

The OUT path 26 and the IN path 27 diverting in the entrance gate 18 merge downstream in a conveying direction of the document G. The pre-scanning roller pair 50 is located at a merging point of the OUT path 26 and the IN path 27. The pre-scanning roller pair 50 conveys the document G, which is conveyed by the first conveying unit 16 or the second conveying unit 17, to the READ document glass 110*a* of the scanner 110. The ADF 10 comprises a scanning sensor 48 configured to detect the document G passing through the pre-scanning roller pair 50. The length from the entrance gate 18 to the merging point of the OUT path 26 and the IN path 27 is larger than, for example, the total length in a traveling direction of a main-size document. The main-size document means a document of a size with a high conveyance frequency among documents of plural sizes that can be conveyed by the ADF 10.

The main-size document means, for example, a document of the A4 size (210 mm×297 mm) of the JIS standard (Japanese Industrial Standard) or the letter size (215.9 mm×279.4 mm), which is the size of letter paper in Europe and the United States, conveyed in a transversal direction and used. The main-size document G is not limited to this. The main-size document G is arbitrary according to a way of using the ADF 10.

The length of the OUT path 26 and the IN path 27 is not limited. The length of the OUT path 26 and the IN path 27 may be larger than, for example, the total length in a traveling direction of a document of a maximum size that can be conveyed by the ADF 10.

Since the length of the OUT path 26 and the IN path 27 is larger than the length in the traveling direction of the main-size document G, the OUT path 26 or the IN path 27 can store the entire length of the main-size document G in the path.

The ADF 10 comprises a paper discharging and conveying unit 52 configured to lead the document G from the READ document glass 110*a* in the direction of a paper discharge tray 51. The paper discharging and conveying unit 52 comprises a paper discharge path 54 that reaches from the READ document glass 110*a* to an exit gate 53, which is a second gate, a post-scanning roller pair 56 configured to convey the document G in the paper discharge path 54, and a paper discharge sensor 57 that detects the document G.

The ADF 10 comprises a discharging and reversing roller pair 58 configured to discharge the document G conveyed by the paper discharging and conveying unit 52 and passed through the exit gate 53 onto the paper discharge tray 51 or switchback the document G and convey the document G to the entrance gate 18. The discharging and reversing roller pair 58 conveys the document G in an arrow f direction during regular rotation and switches back the document G in an arrow g direction during reverse rotation.

The ADF 10 comprises a reversing and conveying unit 60 configured to convey the document G switched back by the discharging and reversing roller pair 58 to the entrance gate 18. The reversing and conveying unit 60 comprises a reversing path 62 that reaches from the exit gate 53 to the registration roller pair 14 and a reversing and conveying roller pair 63 configured to convey the document G in the reversing path 62. The exit gate 53 diverts the document G switched back by the discharging and reversing roller pair 58 in the direction of the reversing path 62.

Figure 2:
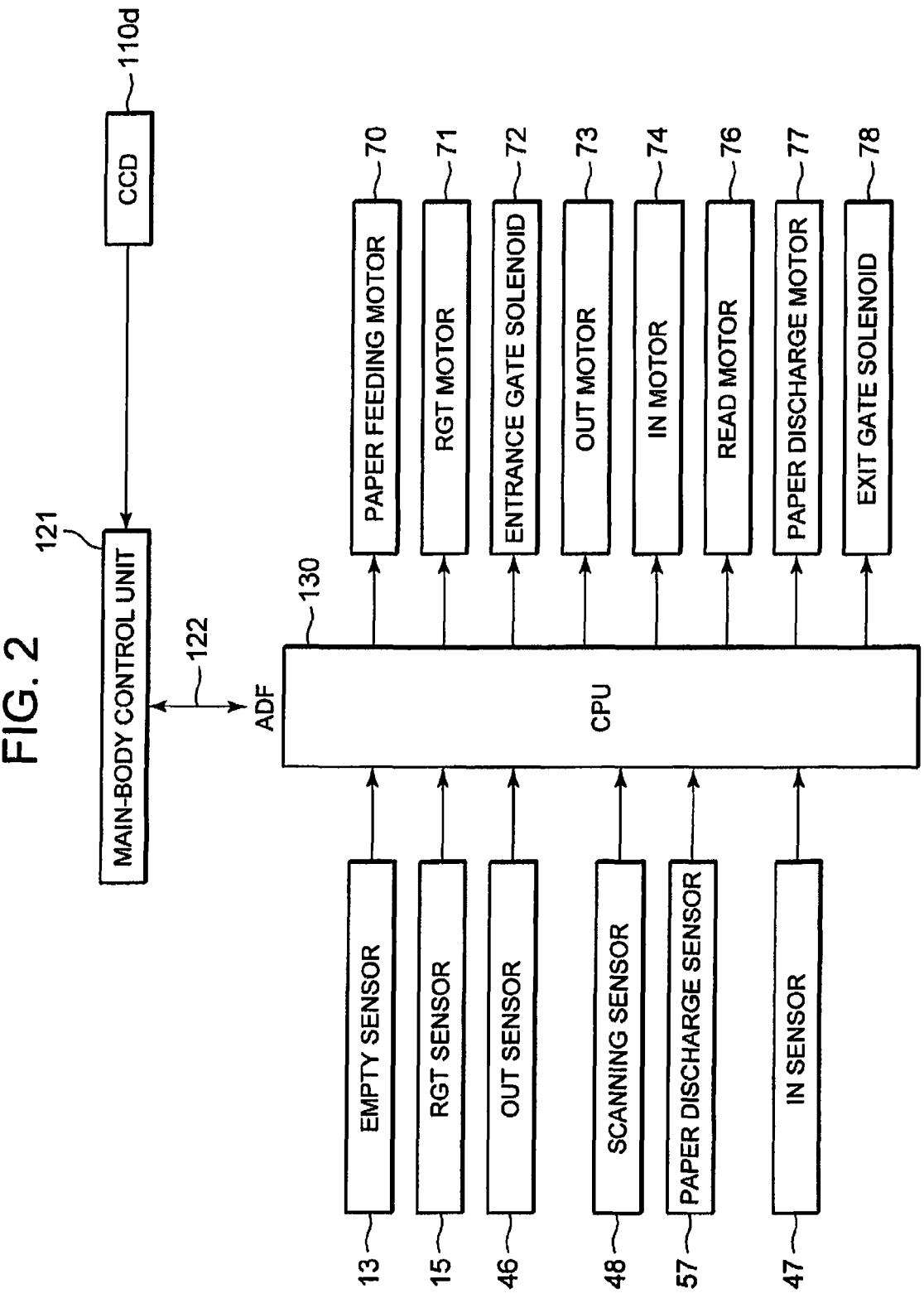
FIG. 2 is a block diagram of a control system of an ADF according to the embodiment.
Figure 3:
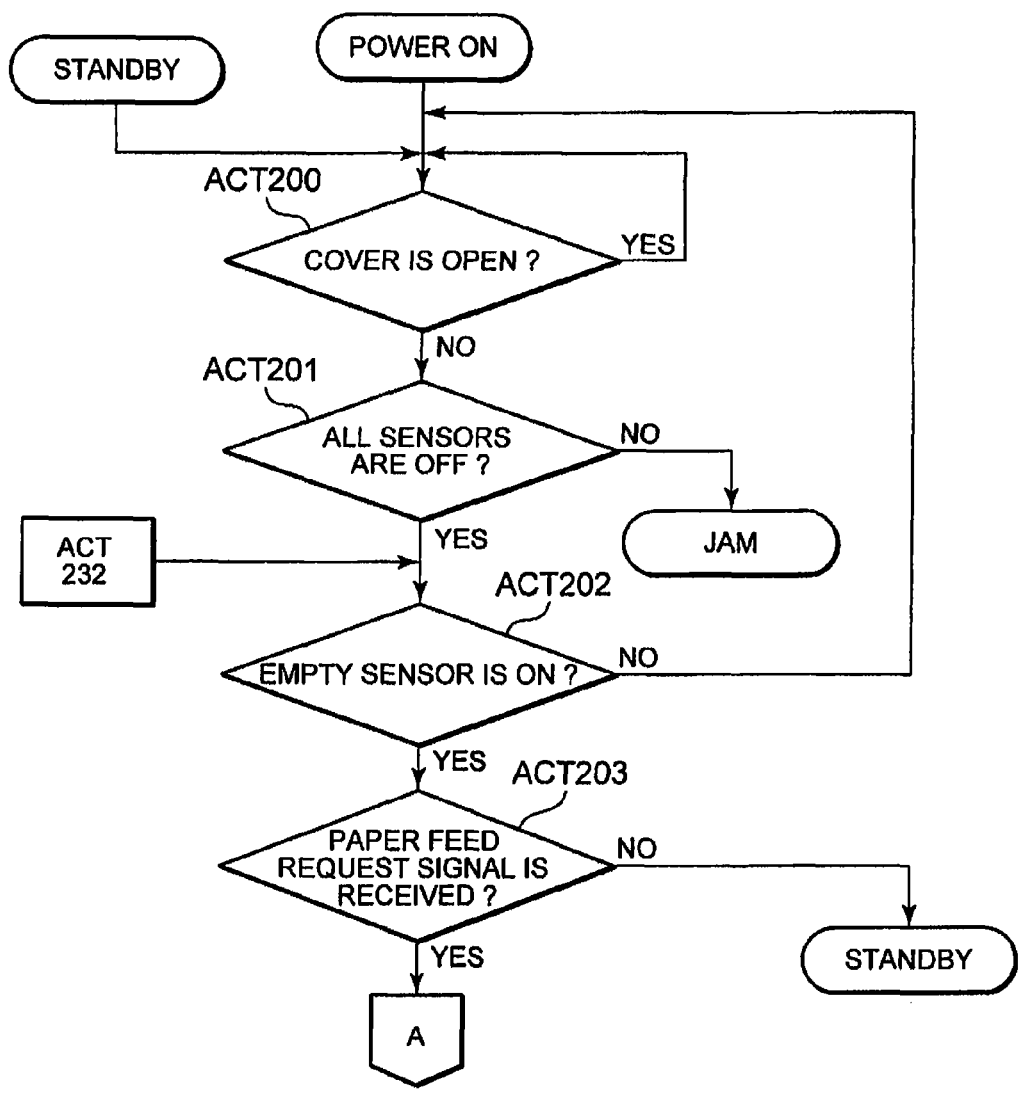
FIG. 3 is a flowchart for explaining power-on to reception of a paper feed request signal according to the embodiment.
Figure 4:
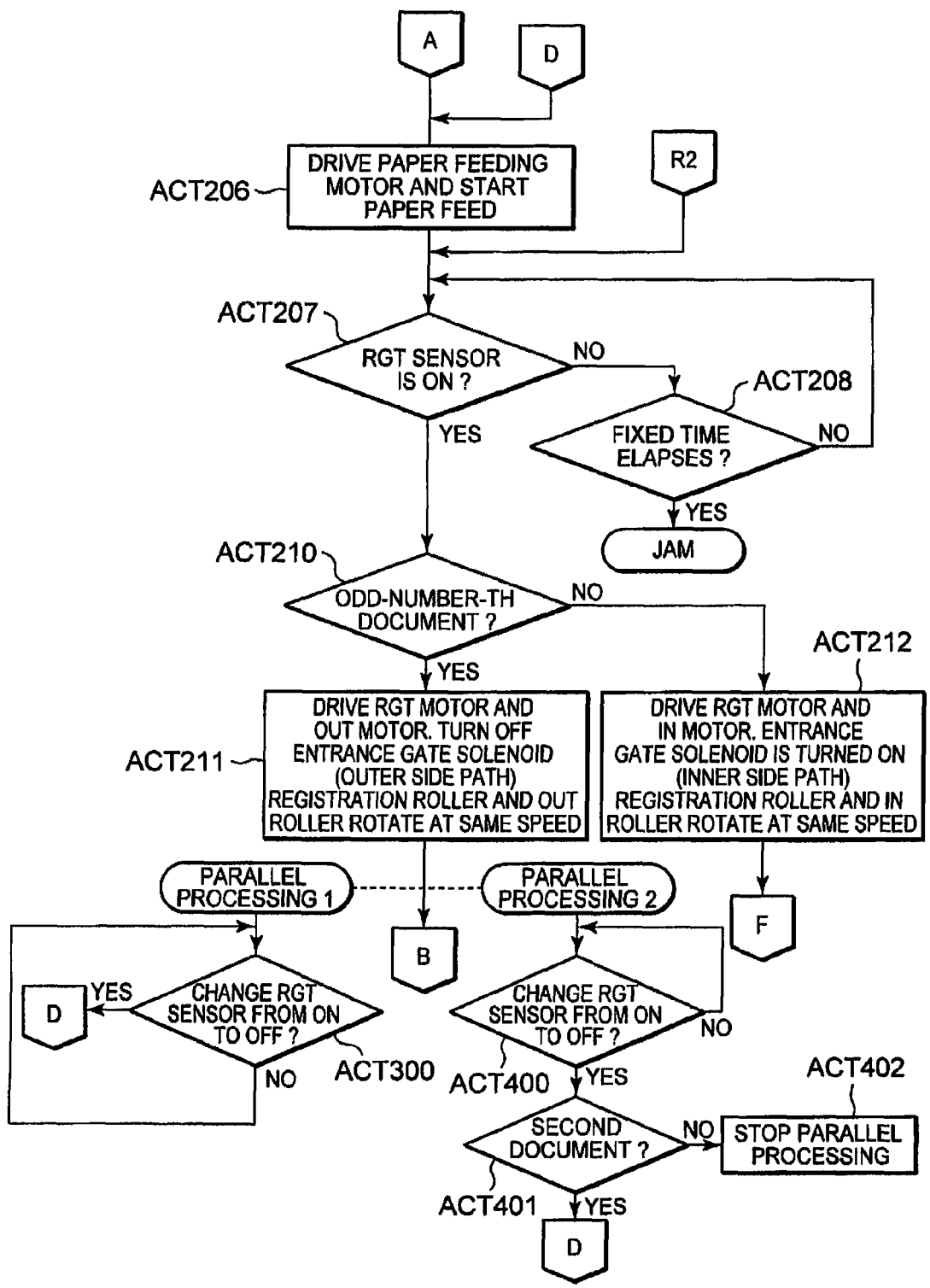
FIG. 4 is a flowchart for explaining feeding of a document to conveyance of the document to an OUT path or an IN path according to the embodiment.
Figure 5:
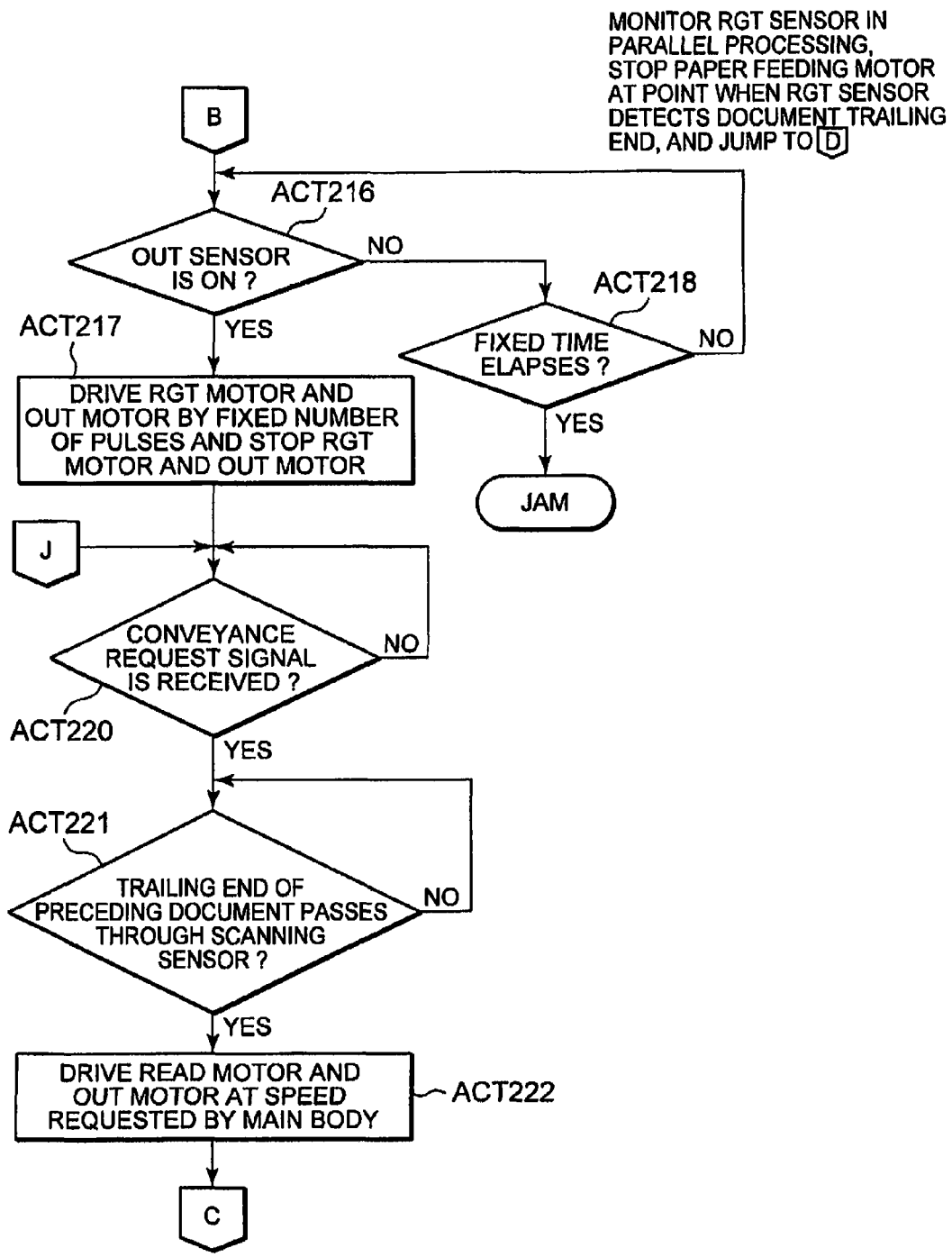
FIG. 5 is a flowchart for explaining conveyance of a document by a first conveying unit according to the embodiment.
Figure 6:
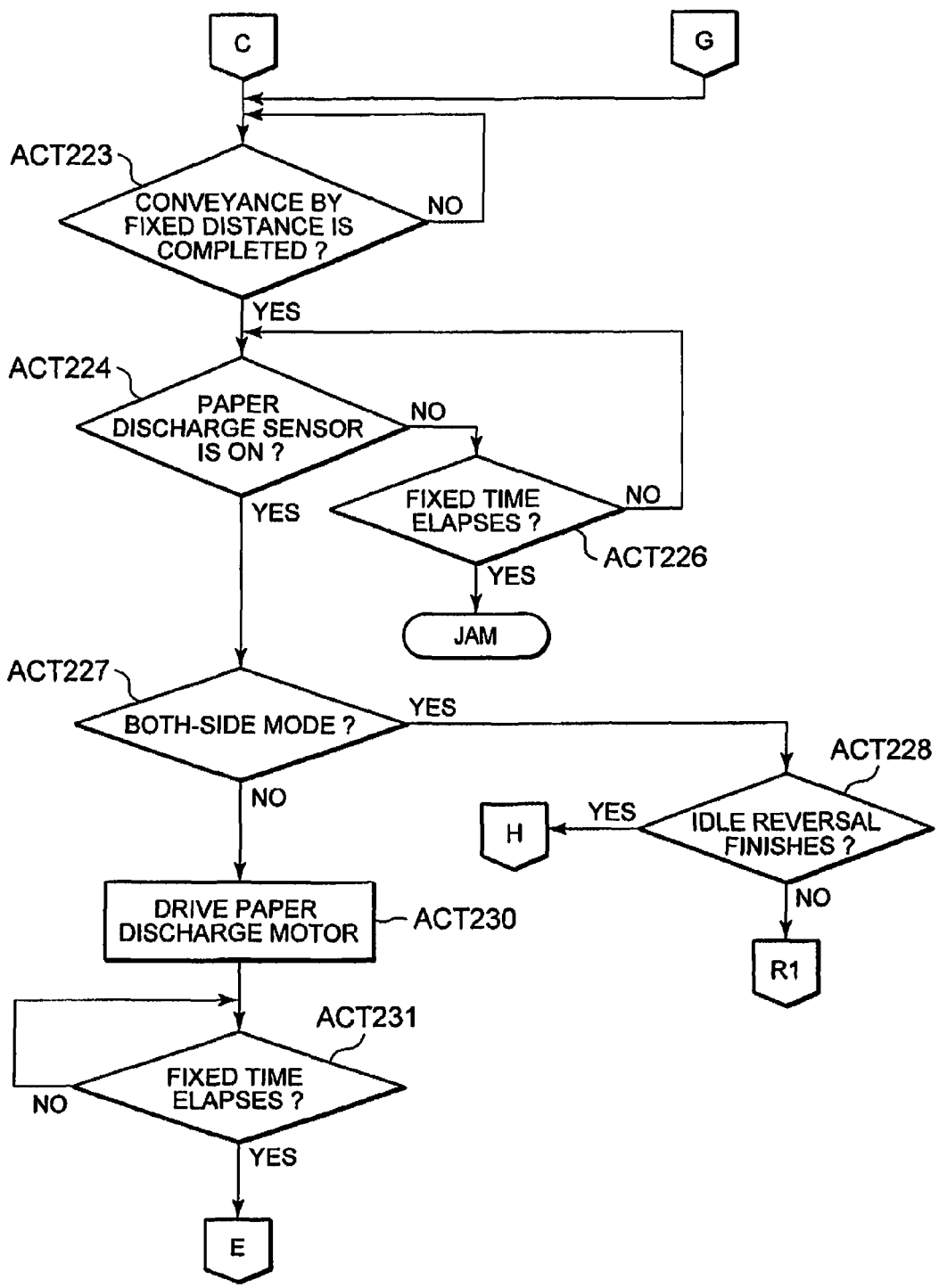
FIG. 6 is a flowchart for explaining the start to the end of image scanning according to the embodiment.
Figure 7:
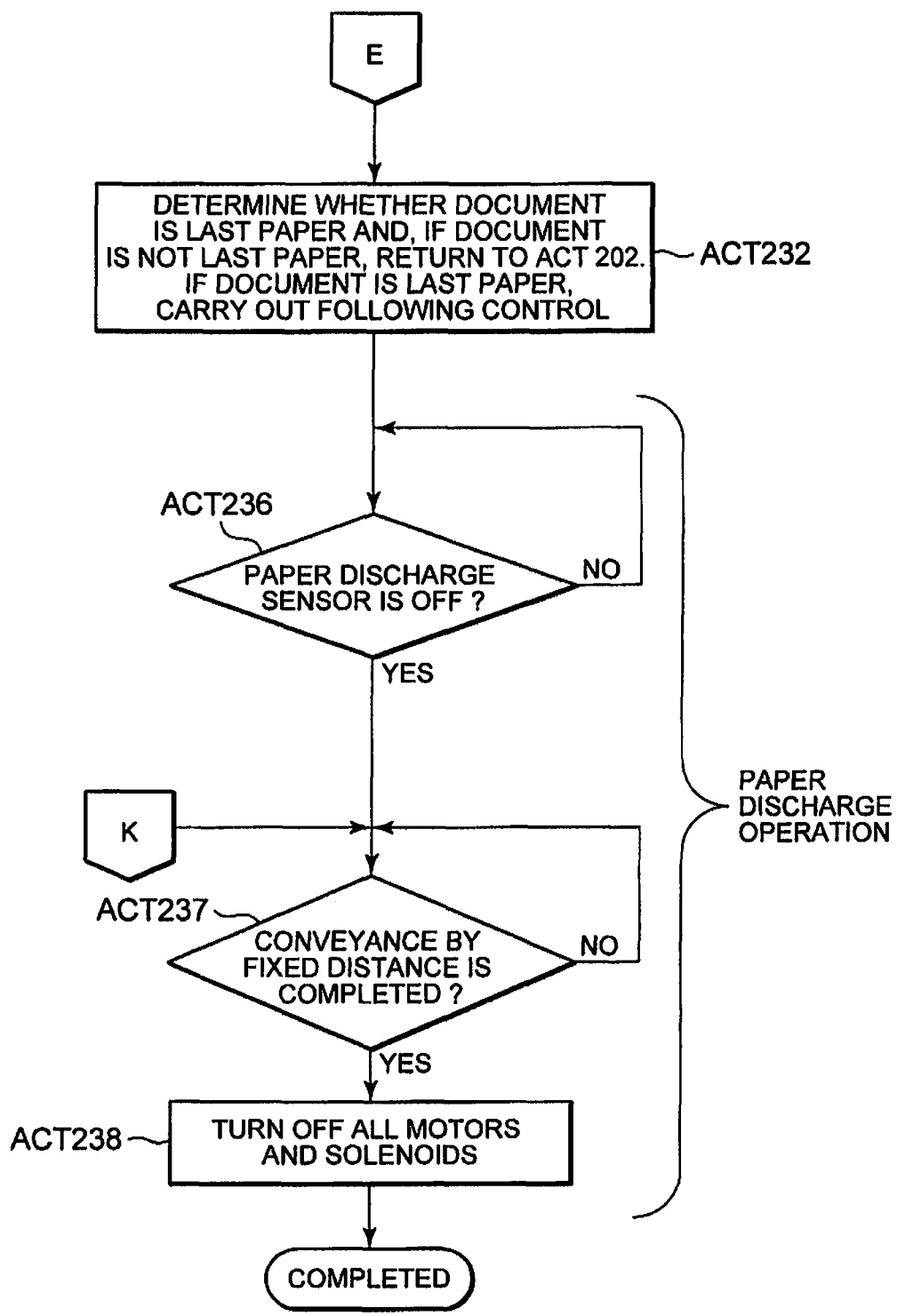
FIG. 7 is a flowchart for explaining discharge of a document according to the embodiment.
Figure 8:
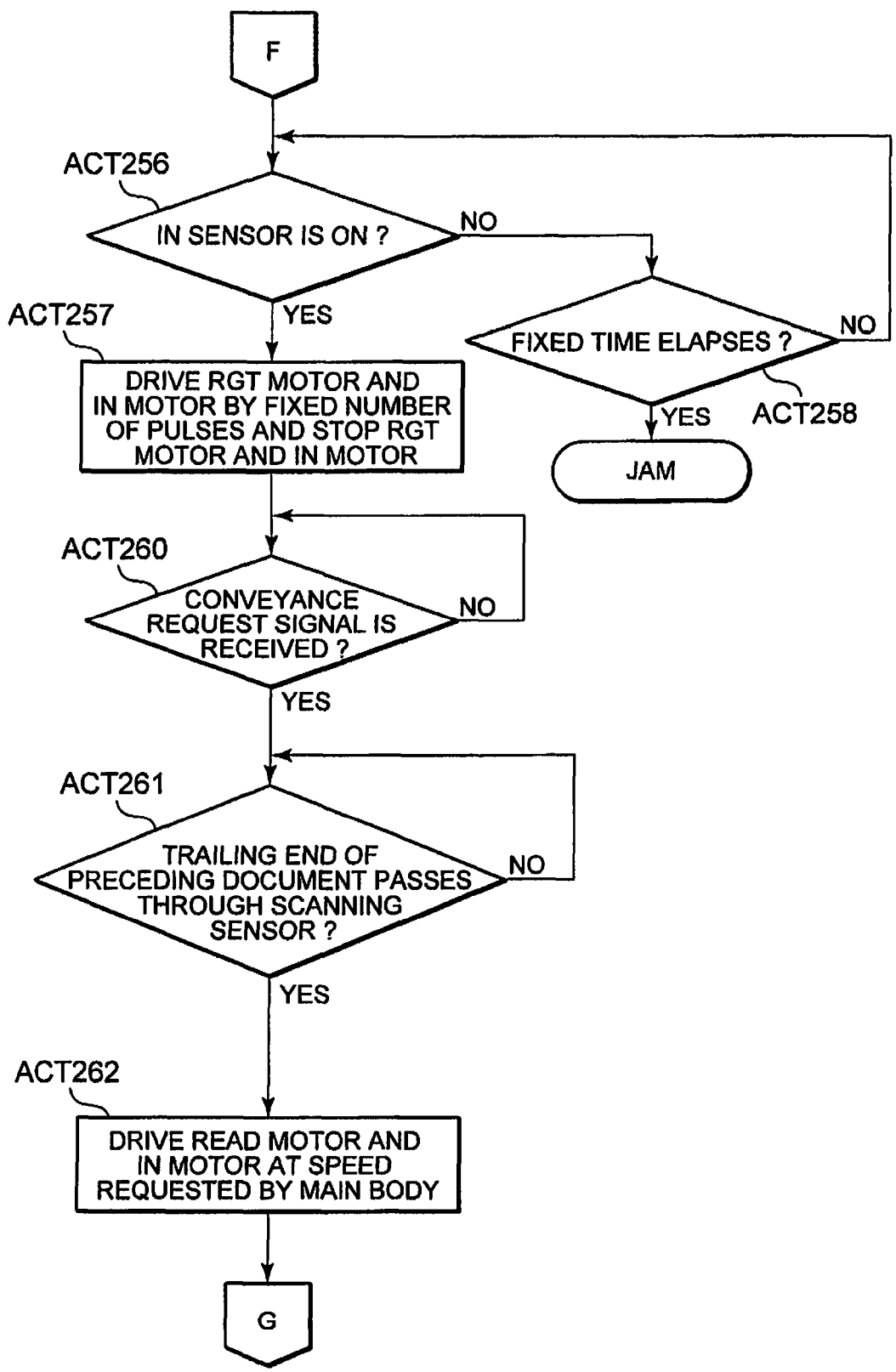
FIG. 8 is a flowchart for explaining conveyance of a document by a second conveying unit according to the embodiment.
Figure 9:
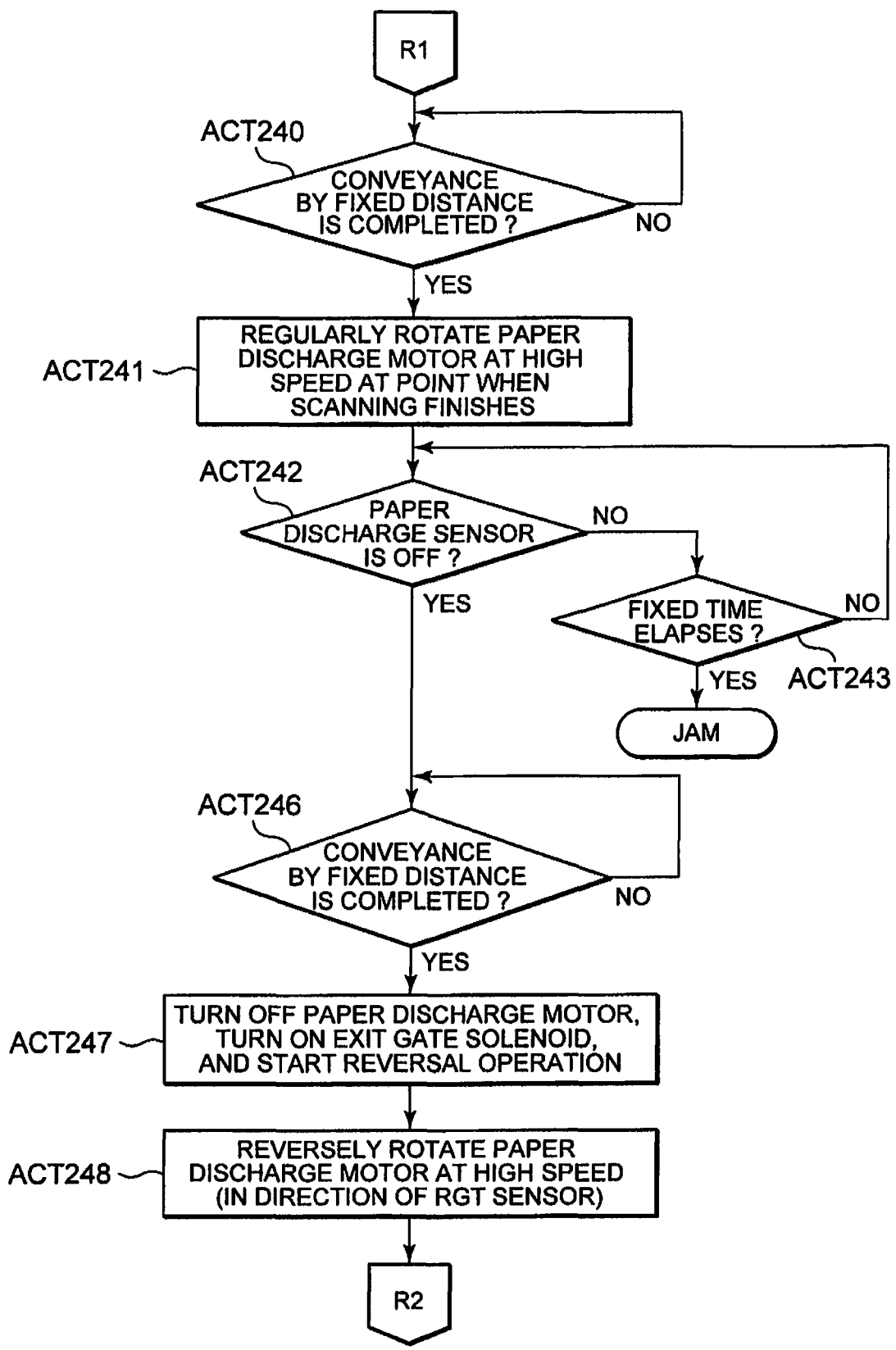
FIG. 9 is a flowchart for explaining reversal of a document according to the embodiment.
Figure 10:
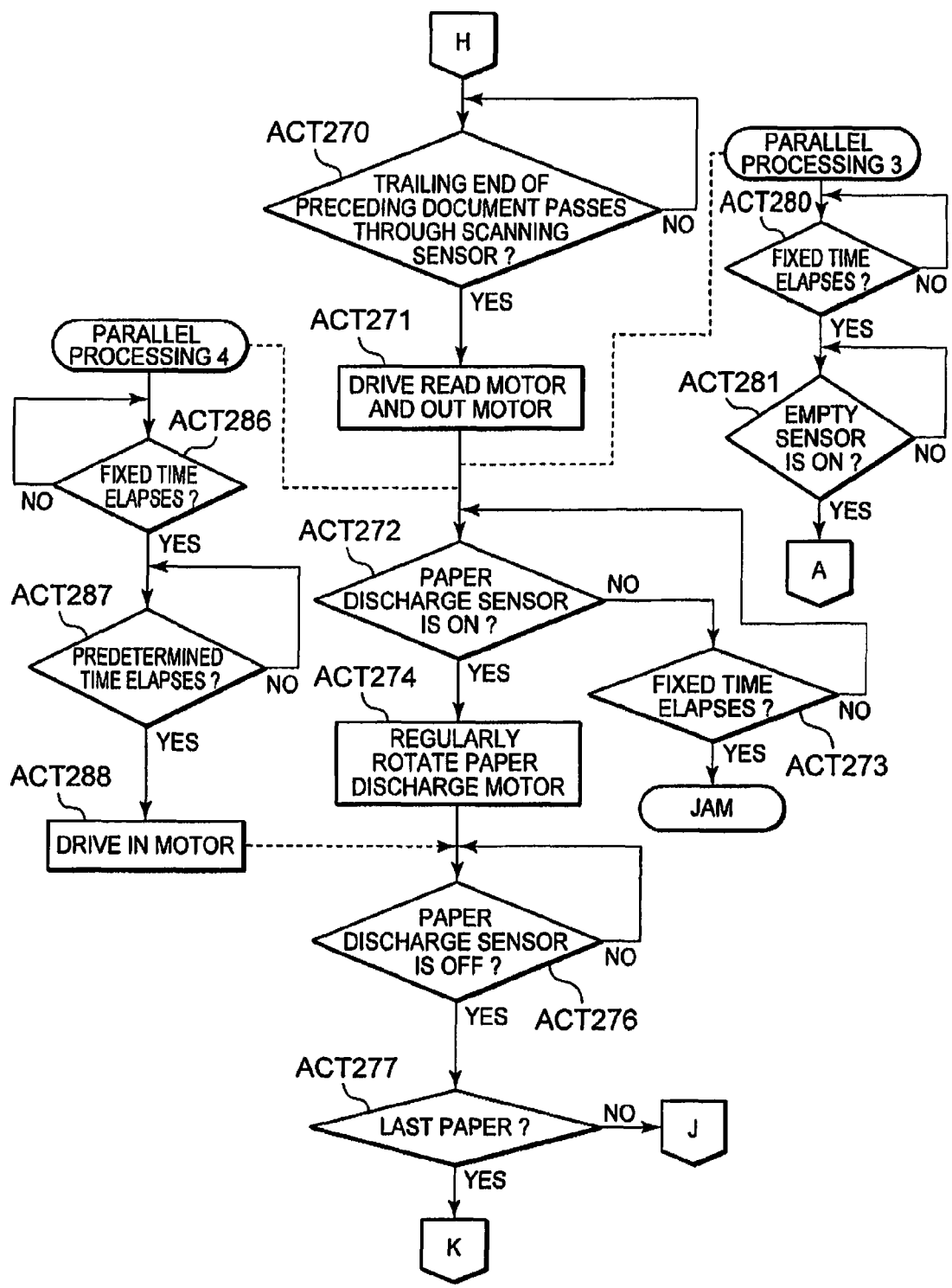
FIG. 10 is a flowchart for explaining discharge after idle reversal of a document according to the embodiment.

A block diagram of a control system 120 mainly for the ADF 10 is shown in FIG. 2. A main-body control unit 121 controls, for example, an entire image forming apparatus comprising the image scanning device 100. The main-body control unit 121 is connected to the CCD 110*d* of the scanner 110. The main-body control unit 121 is connected to a CPU 130 of the ADF 10 via an input and output interface 122. The CPU 130 is connected to the empty sensor 13, the RGT sensor 15, the OUT sensor 46, the IN sensor 47, the scanning sensor 48, and the paper discharge sensor 57 on an input side.

The CPU 130 is connected to a paper feeding motor 70, an RGT motor 71, an entrance gate solenoid 72, an OUT motor 73, an IN motor 74, a READ motor 76, a paper discharge motor 77, and an exit gate solenoid 78 on an output side.

The paper feeding motor 70 drives the feed and pickup roller 12. The RGT motor 71 drives the registration roller pair 14. The entrance gate solenoid 72 operates to switch the entrance gate 18. When the entrance gate solenoid 72 is turned off, the entrance gate 18 pivots in an arrow x direction and diverts the document G in the direction of the OUT path 26, which is the first direction. When the entrance gate solenoid 72 is turned on, the entrance gate 18 pivots in an arrow y direction and diverts the document G in the direction of the IN path 27, which is the second direction.

The OUT motor 73 drives to rotate the OUT roller pair 36. The IN motor 74 drives to rotate the IN roller pair 37. The READ motor 76 drives to rotate the pre-scanning roller pair 50 and the post-scanning roller pair 56. The paper discharge motor 77 drives to rotate the discharging and reversing roller pair 58 and the reversing and conveying roller pair 63. The exit gate solenoid 78 operates to switch the exit gate 53. When the exit gate solenoid 78 is turned off, the exit gate 53 pivots in an arrow v direction and leads the document G from the paper discharge path 54 to the discharging and reversing roller pair 58. When the exit gate solenoid 78 is turned on, the exit gate 53 pivots in an arrow w direction and diverts the document G switched back by the discharging and reversing roller pair 58 in the direction of the reversing path 62.

A conveying process for the document G by the ADF 10 is explained below.

[Conveying Process for Documents Having Size Equal to or Smaller than the Main Size]

A conveying process for main-size documents G, which are A4 size documents used in a transverse mode, is explained with reference to flowcharts of FIGS. 3 to 9. In the conveying process, the documents G are continuously subjected to both-side scanning. After a power supply is turned on, if the size of the documents G is equal to or smaller than the main size, the conveying process is directly started. If the size of the documents G exceeds the main size, for example, indication that the documents G have large size is input from, for example, a control panel of the image forming apparatus. If the documents G have the large size, the image scanning device 100 subjects the documents G to the both-side scanning one by one.

When conveying process is started, in ACT 200, the CPU 130 confirms that a cover of the ADF 10 is closed. In ACT 201, the CPU 130 causes all the sensors to perform detection and confirms that there is no paper jam in the ADF 10. When an operator places the documents G on the document tray 11, the empty sensor 13 is turned on (ACT 202) and transmits a document ON signal to the main-body control unit 121. The CPU 130 waits for a paper feed request signal to be received from the main-body control unit 121 (Yes in ACT 203) and then proceeds to ACT 206.

1. Front-Side Scanning

Figure 11:
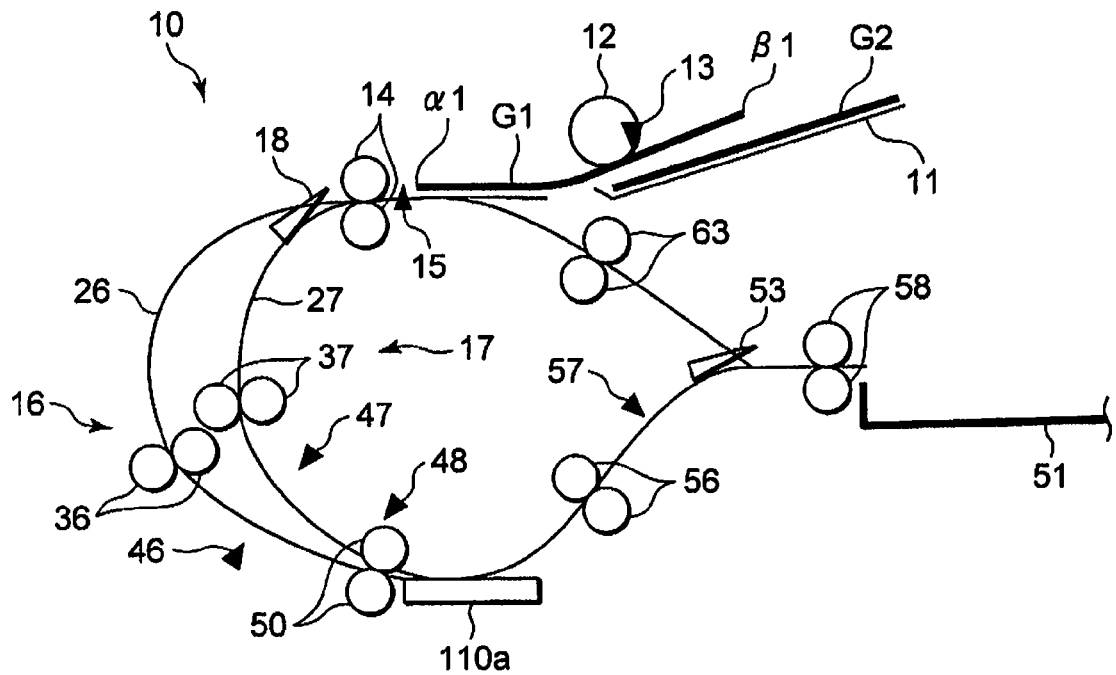
FIG. 11 is a diagram for explaining feeding of a document G1 according to the embodiment.

In ACT 206, the CPU 130 turns on the paper feeding motor 70 configured to drive the feed and pickup roller 12 and starts feeding of the document G1 at the top. As shown in FIG. 11, the ADF 10 feeds the first document G1 in the direction of the registration roller pair 14. If the RGT sensor 15 is not turned on even if a fixed time elapses (No in ACT 207), the CPU 130 waits for the fixed time to elapse (Yes in ACT 208) and then determines that the document G1 causes a paper jam.

If the RGT sensor 15 is turned on (Yes in ACT 207), in ACT 210, the CPU 130 determines whether the document G1 is an odd-number-th document. If the RGT sensor 15 is turned on (Yes in ACT 207), the CPU 130 turns off the paper feeding motor 70 after the fixed time elapses.

If the document G1 is an odd-number-th document (Yes in ACT 210), for example, the CPU 130 turns on the RGT motor 71 and the OUT motor 73 and turns off the entrance gate solenoid 72 (ACT 211) and proceeds to ACT 216. The entrance gate 18 diverts the odd-number-th document G1 to the OUT path 26. The registration roller pair 14 and the OUT roller pair 36 rotate at the same speed and convey the document G1 to the OUT path 26.

If the document G1 is an even-number-th document (No in ACT 210), for example, the CPU 130 turns on the RGT motor 71 and the IN motor 74 and turns on the entrance gate solenoid 72 (ACT 212) and proceeds to ACT 256. The entrance gate 18 diverts the even-number-th document G1 to the IN path 27. The registration roller pair 14 and the IN roller pair 37 rotate at the same speed and convey the document G1 to the IN path 27.

When the document G1 is an odd-number-th document, the CPU 130 may divert the document G1 to the IN path 27. When the document G1 is an even-number-th document, the CPU 130 may divert the document G1 to the OUT path 26.

If the OUT sensor 46 is turned on (Yes in ACT 216), the CPU 130 drives the RGT motor 71 and the OUT motor 73 by a fixed number of pulses and stops the motors (ACT 217). The document G1 stops before the pre-scanning roller pair 50. A trailing end β1 of the document G1 passes through the entrance gate 18. The document G1 stays on standby in the OUT path 26. If the OUT sensor 46 is not turned on even if the fixed time elapses (No in ACT 216), the CPU 130 waits for the fixed time to elapse (Yes in ACT 218) and then determines that the document G1 causes a paper jam.

When the trailing end β1 of the document G1 passes through the RGT sensor 15, separately from the conveying process for the document G1, the CPU 130 starts, as parallel processing, a paper feeding process for a document G2, which is the following document, in parallel. In scanning of a simplex mode, as parallel processing 1, if the trailing end β1 of the first document G1 passes through the RGT sensor 15 and the RGT sensor 15 changes from ON to OFF (Yes in ACT 300), the CPU 130 proceeds to ACT 206 and starts feeding of the second document G2.

Figure 12:
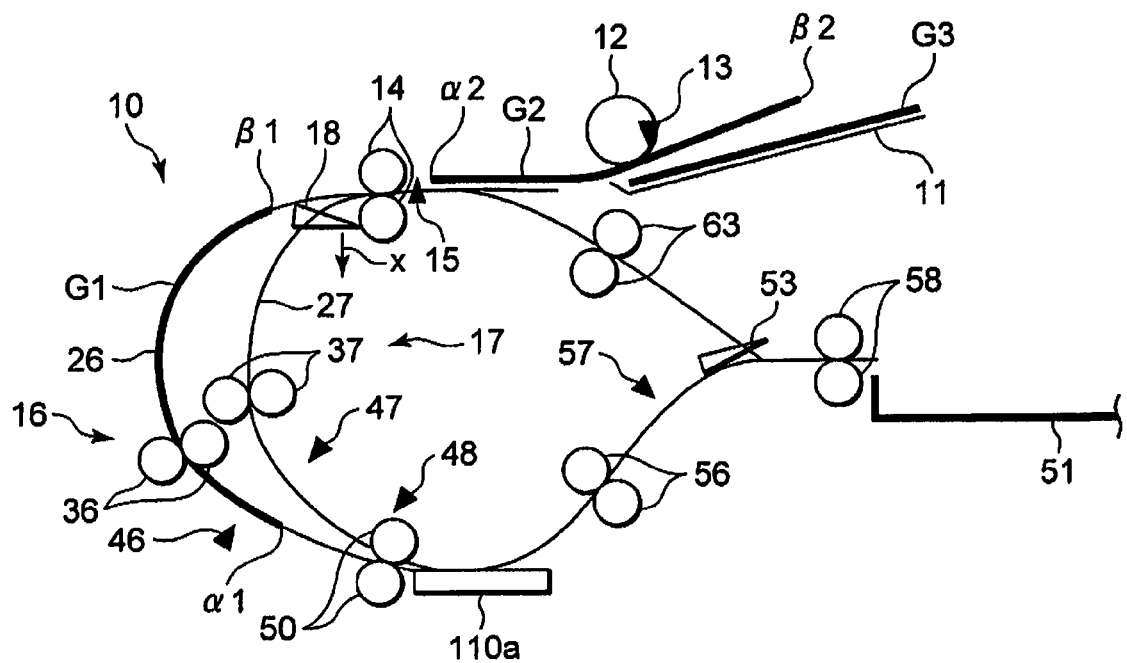
FIG. 12 is a diagram for explaining feeding of a document G2 according to the embodiment.

In scanning of a both-side mode, if the trailing end β1 of the first document G1 passes through the RGT sensor 15 and the RGT sensor 15 changes from ON to OFF (Yes in ACT 400), as parallel processing 2, the CPU 130 proceeds to ACT 401. If the document G2 is the second document (Yes In ACT 401), the CPU 130 proceeds to ACT 206 and starts feeding of the second document G2. As shown in FIG. 12, the ADF 10 puts the first document G1 on standby in the OUT path 26 and feeds the second document G2 in the direction of the registration roller pair 14.

If the document G2 turns on the RGT sensor 15 (Yes in ACT 207), the CPU 130 determines that the second document G2 is an even-number-th document (No in ACT 210), turns on the RGT motor 71 and the IN motor 74, turns on the entrance gate solenoid 72 (ACT 212), and proceeds to ACT 256. The entrance gate 18 diverts the second document G2 to the IN path 27. The registration roller pair 14 and the IN roller pair 37 rotate at the same speed and convey the document G2 to the IN path 27.

If the IN sensor 47 is turned on (Yes in ACT 256), the CPU 130 drives the RGT motor 71 and the IN motor 74 by a fixed number of pulses and stops the motors (ACT 257). The document G2 stops before the pre-scanning roller pair 50. A trailing end β2 of the document G2 passes through the entrance gate 18. The document G2 stays on standby in the IN path 27. If the IN sensor 47 is not turned on even if a fixed time elapses (No in ACT 256), the CPU 130 waits for the fixed time to elapse (Yes in ACT 258) and then determines that the document G2 causes a paper jam. If the document G2 is not the second document (No in ACT 401), the CPU 130 stops the parallel processing.

The CPU 130 waits for a conveyance request signal to be received from the main-body control unit 121 (Yes in ACT 220) and then proceeds to ACT 221. If the scanner 110 can scan a document, the main-body control unit 121 transmits a conveyance request signal to the CPU 130. In ACT 221, if there is a document preceding the document G1, the CPU 130 determines whether the trailing end of the preceding document passes through the scanning sensor 48.

If the trailing end of the preceding document passes through the scanning sensor 48 (Yes in ACT 221), in ACT 222, the CPU 130 turns on the READ motor 76 and the OUT motor 73. The OUT roller pair 36, the pre-scanning roller pair 50, and the post-scanning roller pair 56 rotate at speed requested by the main-body control unit 121 and conveys the document G1 to the READ document glass 110a.

Figure 13:
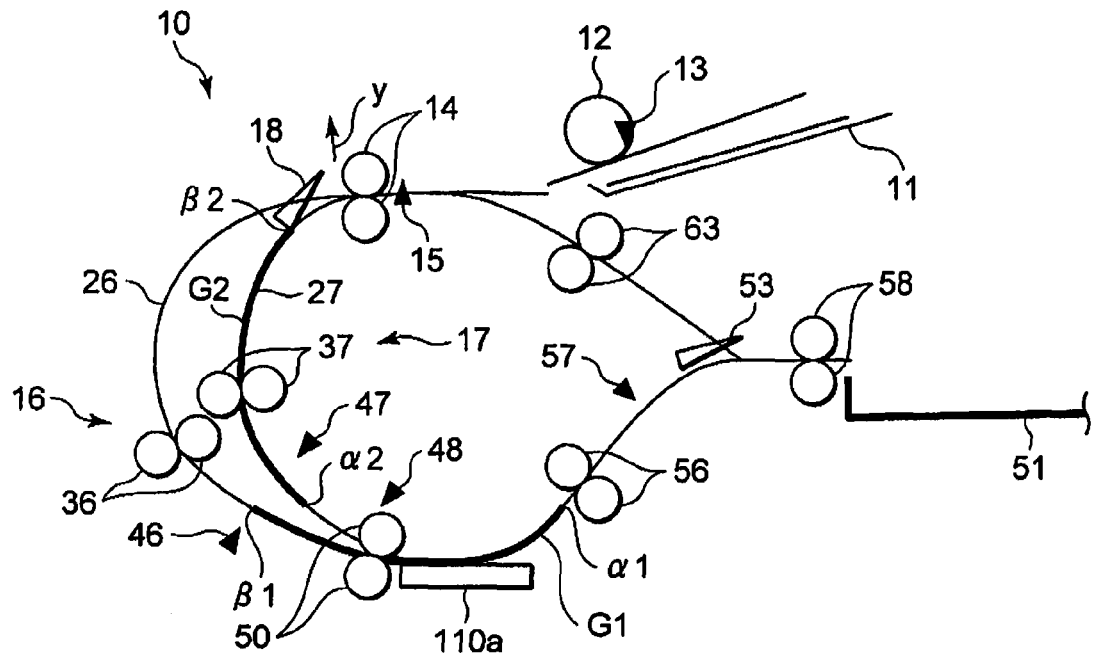
FIG. 13 is a diagram for explaining image scanning for the front side of the document G1 and standby in the IN path of the document G2 according to the embodiment.

After the document G1 starts to be conveyed to the READ document glass 110a, if the document G1 is conveyed a fixed distance (Yes in ACT 223), the scanner 110 starts image scanning for the front side of the document G1. As shown in FIG. 13, the ADF 10 puts the second document G2 on standby in the IN path 27 while scanning an image on the front side of the first document G1.

If the paper discharge sensor 57 is not turned on even if the fixed time elapses (No in ACT 224), the CPU 130 waits for the fixed time to elapse (Yes in ACT 226) and then determines that the document G1 causes a paper jam. If the document G1 turns on the paper discharge sensor 57 while moving forward through the paper discharge path 54 (Yes in ACT 224), in ACT 227, the CPU 130 determines whether scanning in the both-side mode is performed.

If the scanning in the both-side mode is performed (Yes in ACT 227), the CPU 130 proceeds to ACT 228. If the scanning is scanning in the simplex mode (No in ACT 227), the CPU 130 turns off the exit gate 53 and drives the paper discharge motor 77 (ACT 230). The exit gate 53 leads the document G1 in the direction of the paper discharge path 54. The paper discharging and reversing roller pair 58 and the reversing and conveying roller pair 63 regularly rotate and convey the document G1 in the arrow f direction from the paper discharge path 54 to the paper discharge tray 51.

If a fixed time elapses after the conveyance of the document G1 is started by the paper discharging and reversing roller pair 58 and the image scanning for the front side of the first document G1 by the scanner 110 finishes (Yes in ACT 231), the CPU 130 proceeds to ACT 232. In ACT 232, the CPU 130 determines whether a document is the last paper. If the document is not the last paper, the CPU 130 returns to ACT 202. If the document is the last paper in ACT 232, the CPU 130 discharges the document.

In a paper discharge operation, if the paper discharge sensor 57 is turned off (Yes in ACT 236) and if the last document is conveyed a fixed distance by the paper discharging and reversing roller pair 58 (Yes in ACT 237), the CPU 130 turns off all the motors and solenoids (ACT 238) and completes the conveyance of documents by the ADF 10.

In ACT 228, the CPU 130 determines whether idle reversal of the document G1 finishes. If the idle reversal of the document G1 finishes (Yes in ACT 228), the CPU 130 proceeds to ACT 270. If the idle reversal of the document G1 does not finish (No in ACT 228), the CPU 130 proceeds to ACT 240.

After the image scanning for the front side of the document G1 by the scanner 110 is started, if the document G1 is conveyed a fixed distance (Yes in ACT 240), at a point when the image scanning for the front side of the document G1 by the scanner 110 finishes, the CPU 130 regularly rotates the paper discharge motor 77 at high speed (ACT 241). The discharging and reversing roller pair 58 conveys the document G1 in the direction of the paper discharge tray 51 from the paper discharge path 54 at high speed. Conveying speed of the discharging and reversing roller pair 58 is, for example, 423 mm/sec during image scanning and 900 mm/sec during high-speed conveyance. If the paper discharge sensor 57 is not turned off even if a fixed time elapses (No in ACT 242), the CPU 130 waits for the fixed time to elapse (Yes in ACT 243) and then determines that the document G1 causes a paper jam.

If the trailing end β1 of the document G1 passes through the paper discharge sensor 57 and the paper discharge sensor 57 is turned off (Yes in ACT 242), the CPU 130 proceeds to ACT 246. If the paper discharge sensor 57 is turned off (Yes in ACT 242), the CPU 130 stops the READ motor 76 and the OUT motor 73. After high-speed conveyance of the document G1 in the direction of the paper discharge tray 51, if the document G1 is conveyed a fixed distance (Yes in ACT 246), the CPU 130 proceeds to ACT 247. In ACT 247, if the trailing end β1 of the document G1 passes through the exit gate 53, the CPU 130 turns off the paper discharge motor 77, turns on the exit gate solenoid 78, and proceeds to ACT 248. The conveyance of the document G1 in the arrow f direction is stopped.

2. Front-Side Scanning to Reversal

In ACT 248, the CPU 130 reversely rotates the paper discharge motor 77 at high speed. The discharging and reversing roller pair 58 switches back the document G1and conveys the document G1 in the arrow g direction at high speed. The exit gate 53 leads the trailing end β1 of the document G1 to the reversing path 62. The CPU 130 proceeds to ACT 207 in order to scan the rear side of the document G1.

After the image scanning for the front side of the first document G1 finishes, in order to scan an image on the front side of the second document G2 in parallel, the CPU 130 waits for a conveyance request signal to be received from the main-body control unit 121 in ACT 260 (Yes in ACT 260) and then proceeds to ACT 261. When the leading end α1 of the switched-back document G1 passes through the exit gate 53, the main-body control unit 121 transmits a conveyance request signal to the CPU 130 at timing when the leading end α2 of the second document G2 reaches the exit gate 53.

In ACT 261, the CPU 130 determines whether the trailing end of the preceding document passes through the scanning sensor 48. If the trailing end of the preceding document passes through the scanning sensor 48 (Yes in ACT 261), in ACT 262, the CPU 130 turns on the READ motor 76 and the IN motor 74. The IN roller pair 37, the pre-scanning roller pair 50, and the post-scanning roller pair 56 rotate at speed requested by the main-body control unit 121 and convey the document G2 to the READ document glass 110a.

Figure 14:
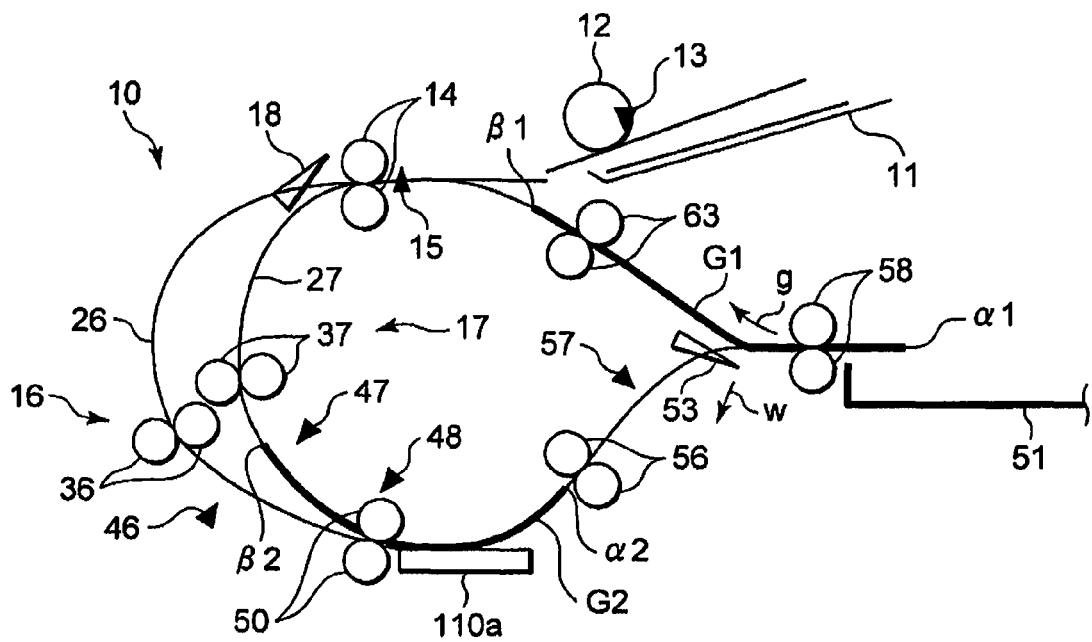
FIG. 14 is a diagram for explaining reversal of the document G1 and image scanning for the front side of the document G2 according to the embodiment.

The CPU 130 proceeds from ACT 262 to ACT 223. The scanner 110 starts image scanning for the front side of the document G2. As shown in FIG. 14, the ADF 10 switches back the first document G1 in the arrow g direction at high speed and conveys the second document G2 to the READ document glass 110a.

3. Reversal to Rear-Side Scanning

Figure 15:
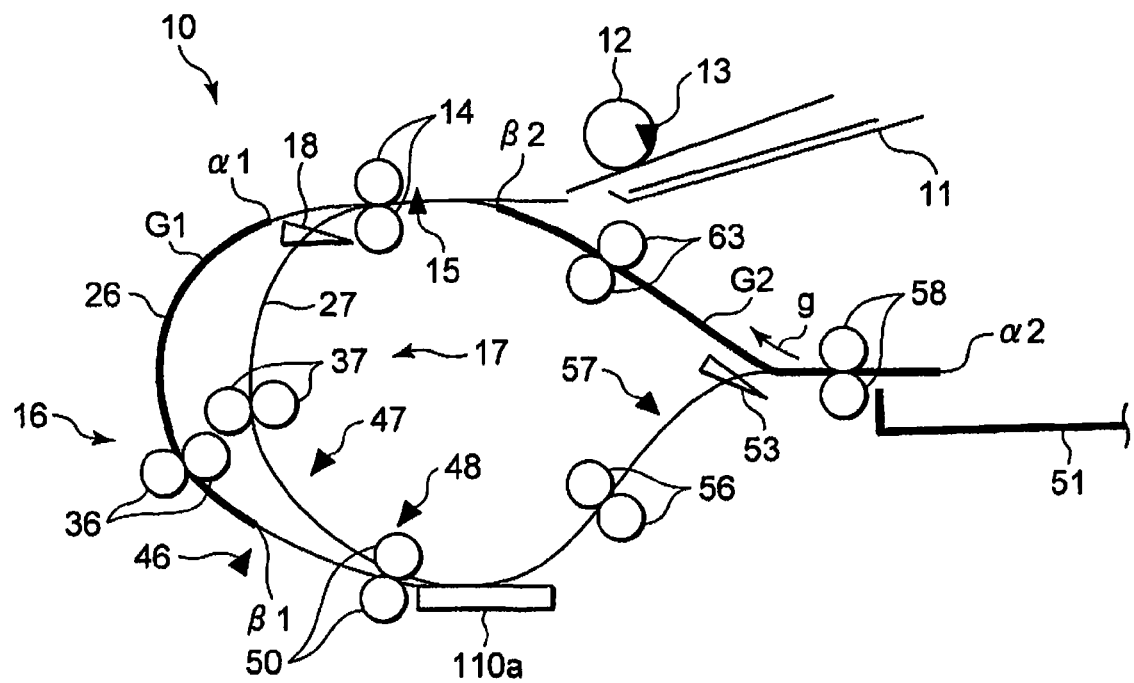
FIG. 15 is a diagram for explaining standby in the OUT path of the reversed document G1 and reversal of the document G2 according to the embodiment.

After proceeding from ACT 248 to ACT 207 in order to scan the rear side of the document G1, the CPU 130 scans the rear side of the reversed document G1 in the same manner as the scanning of the front side of the document G1. The CPU 130 puts the reversed document G1 on standby in the OUT path 26 through ACTS 207, 210, 211, 216, and 217. In parallel, the CPU 130 executes a flow shown in FIG. 9 and reverses the second document G2 through ACTS 262, 223, 224, 227, and 228. As shown in FIG. 15, the ADF 10 puts the reversed document G1 on standby in the OUT path 26 and switches back the second document G2 in the arrow g direction at high speed.

Figure 16:
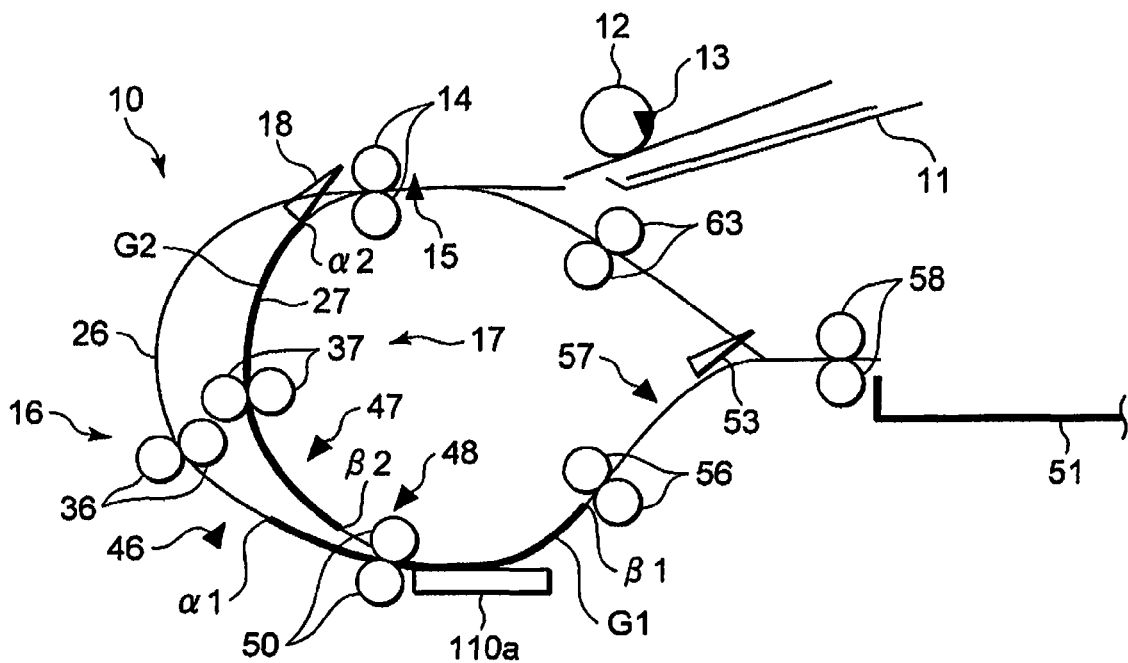
FIG. 16 is a diagram for explaining image scanning for the rear side of the document G1 and standby in the IN path of the reversed document G2 according to the embodiment.

If the CPU 130 receives a conveyance request signal from the main-body control unit 121 (Yes in ACT 220) and finishes the image scanning for the front side of the document G2 and the trailing end of the document G2 passes through the scanning sensor 48 (Yes in ACT 221), the CPU 130 scans an image on the rear side of the document G1 through ACTS 222 and 223. In order to scan the rear side of the reversed document G2 in parallel, the CPU 130 proceeds from ACT 248 to ACTS 207, 210, 212, 256, and 257. The reversed document G2 stays on standby in the IN path 27. As shown in FIG. 16, the ADF 10 scans the image on the rear side of the document G1 and puts the reversed document G2 on standby in the IN path 27.

4. Rear-Side Scanning to Idle Reversal

Figure 17:
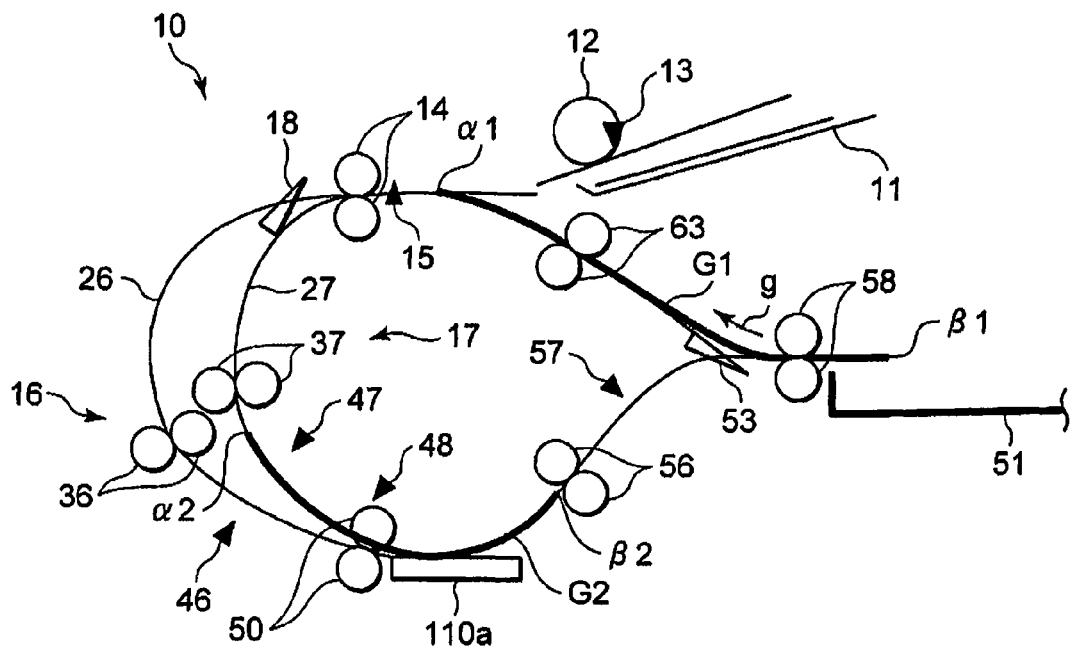
FIG. 17 is a diagram for explaining idle reversal of the document G1 and image scanning for the rear side of the document G2 according to the embodiment.

The ADF 10 idly reverses the document G1 after the both-side scanning such that the front side faces down on the paper discharge tray 51. The CPU 130 executes the flow shown in FIG. 9 and idly reverses the first document G1 through ACTS 224, 227, and 228. In parallel, after the image scanning for the rear side of the first document G1 finishes, in order to scan an image on the rear side of the second document G2, the CPU 130 scans the image on the rear side of the document G2 through ACTS 260, 261, 262, and 223. As shown in FIG. 17, the ADF 10 switches back the first document G1 in the arrow g direction at high speed and conveys the reversed second document G2 to the READ document glass 110a.

5. Idle Reversal to Paper Discharge

Figure 18:
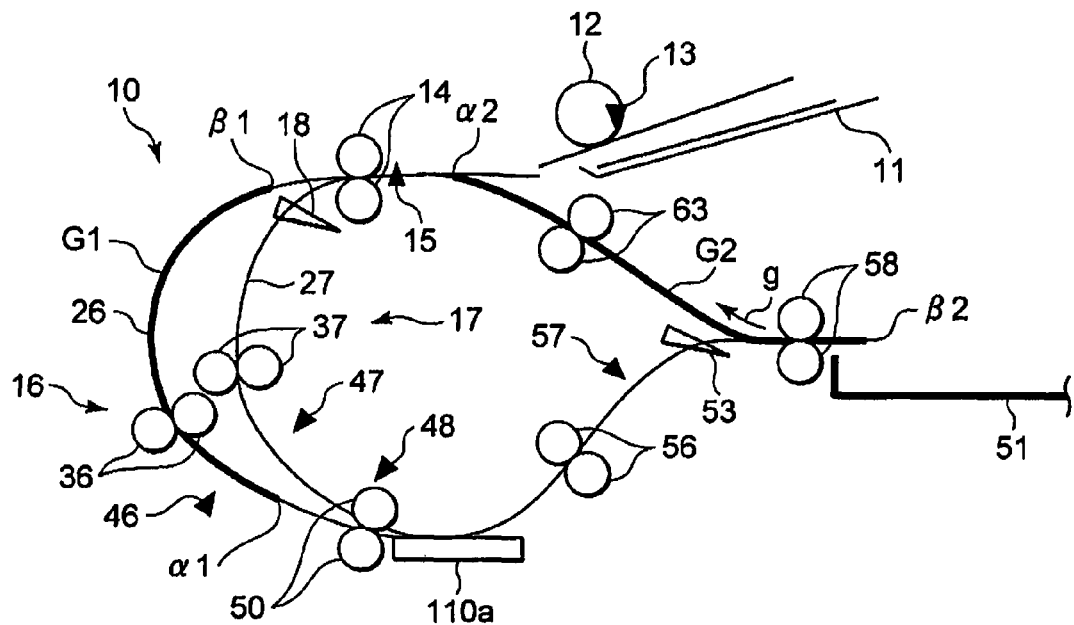
FIG. 18 is a diagram for explaining standby in the OUT path of the idly-reversed document G1 and idle reversal of the document G2 according to the embodiment.

In order to discharge idly-reversed document G1, the CPU 130 proceeds from ACT 248 to ACT 207 and puts the idly-reversed document G1 on standby in the OUT path 26 through ACTS 210, 211, 216, and 217 in the same manner as the scanning of the front side of the document G1. In parallel, the CPU 130 executes the flow shown in FIG. 9 and idly reverses the second document G2 through ACTS 262, 223, 224, 227, and 228. As shown in FIG. 18, the ADF 10 puts the idly-reversed document G1 on standby in the OUT path 26 and switches back the idly-reversed second document G2 in the arrow g direction at high speed.

If the image scanning for the rear side of the document G2 finishes and the trailing end of the document G2 passes through the scanning sensor 48 (Yes in ACT 270), in ACT 271, the CPU 130 turns on the READ motor 76 and the OUT motor 73. The OUT roller pair 36, the pre-scanning roller pair 50, and the post-scanning roller pair 56 convey the document G1 to the READ document glass 110a and discharge the document G1. The scanner 110 does not perform image scanning. The OUT roller pair 36, the pre-scanning roller pair 50, and the post-scanning roller pair 56 rotate at high speed. Rotating speed of the OUT roller pair 36, the pre-scanning roller pair 50, and the post-scanning roller pair 56 is, for example, 673 r.p.m. when the scanner 110 performs image scanning and 1433 r.p.m. during high-speed rotation.

Figure 19:
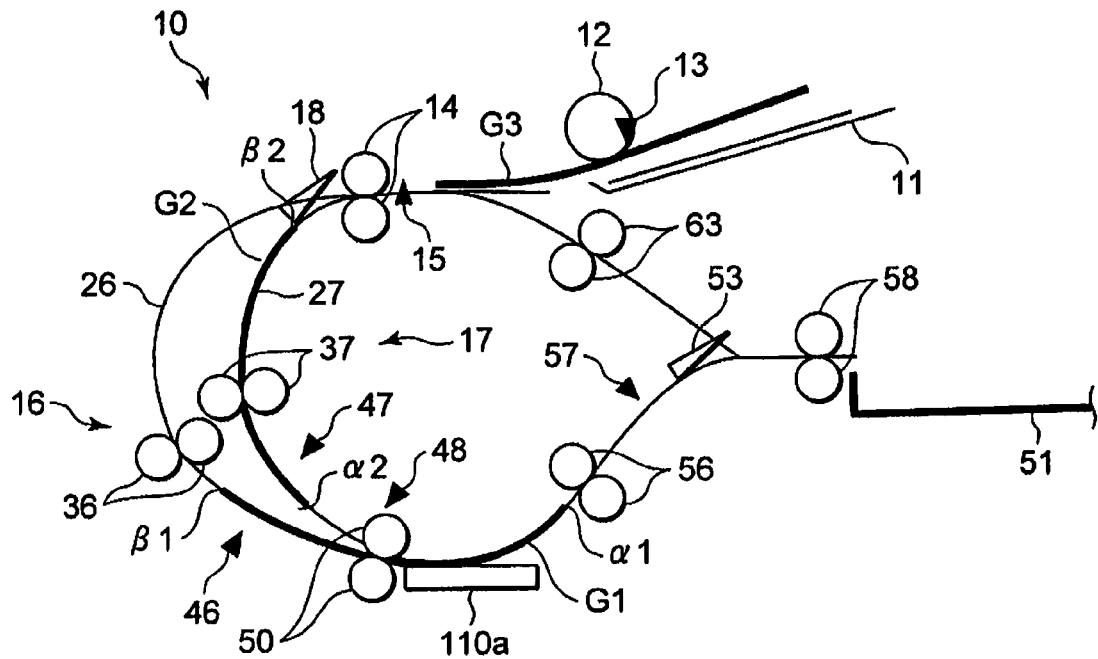
FIG. 19 is a diagram for explaining discharge of the idly-reversed document G1, standby in the IN path of the document G2, and feeding of a third document G3 according to the embodiment.

After starting the discharge of the document G1 in ACT 271, if there is the following document, as parallel processing 3, the CPU 130 starts a paper feeding process for the third document G3 in parallel. After starting the discharge of the document G1, if a predetermined time elapses (Yes in ACT 280) and if the document G1 passes through the OUT path 26 and the empty sensor 13 is on (Yes in ACT 281), the CPU 130 proceeds to ACT 206 and starts feeding of the third document G3. The third document G3 moves forward in the direction of the registration roller pair 14. As shown in FIG. 19, the ADF 10 conveys the idly-reversed document G1 in a paper discharge direction, puts the idly-reversed document G2 on standby in the IN path 27, and supplies the third document G3 in the direction of the registration roller pair 14.

The CPU 130 puts the document G3, which moves forward in the direction of the registration roller pair 14, on standby in the OUT path 26 through ACTS 206, 207, 210, 211, 216, and 217.

After starting conveyance of the document G1 in ACT 271, as parallel processing 4, the CPU 130 discharges the document G2 following the document G1. After starting discharge of the document G1, if the scanning sensor 48 is turned on (Yes in ACT 286) and if a predetermined time elapses (Yes in ACT 287), in ACT 288, the CPU 130 turns on the IN motor 74. The IN roller pair 37, the pre-scanning roller pair 50, and the post-scanning roller pair 56 rotate at high speed, convey the document G2 to the READ document glass 110a, and discharge the document G2. A space between the document G1 and the document G2 following the document G1 is set to 0 mm.

When the space between the document G1 and the document G2 is 0 mm, this means that a distance between the trailing end β1 of the document G1 and the leading end α2 of the document G2 only has to be nearly 0 mm. This also means that the trailing end β1 of the document G1 and the leading end α2 of the document G2 may overlap slightly. If the trailing end β1 of the document G1 and the leading end α2 of the document G2 overlap, the documents G1 and G2 are conveyed with the leading end α2 of the following document G2 placed on the trailing end β1 of the preceding document G1. The order of pages is prevented from being changed on the paper discharge tray 51.

Figure 20:
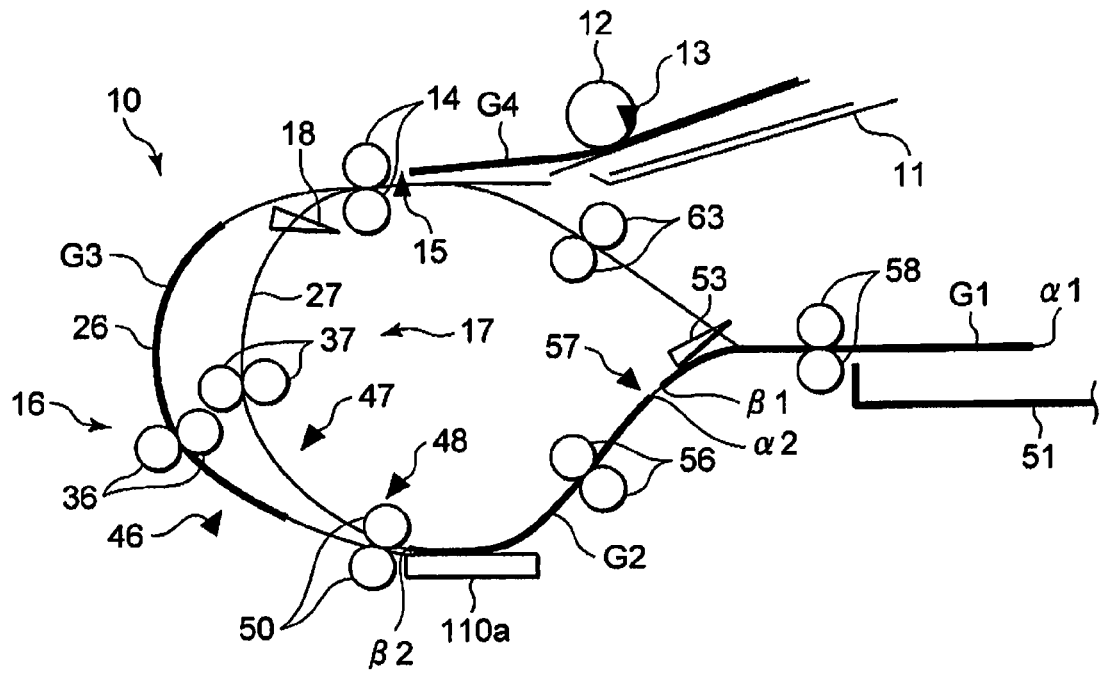
FIG. 20 is a diagram for explaining discharge of the idly-reversed documents G1 and G2, standby in the OUT path of the document G3, and feeding of a fourth document G4.

When discharge of the document G2 is started in ACT 288, as the parallel processing 3, if there is the following document, the CPU 130 starts a paper feeding process for the fourth document G4 in parallel. After the discharge of the document G2 is started, if a predetermined time elapses (Yes in ACT 280) and if the document G2 passes through the IN path 27 and the empty sensor 13 is on (Yes in ACT 281), the CPU 130 proceeds to ACT 206 and starts feeding of the fourth document G4. The fourth document G4 moves forward in the direction of the registration roller pair 14. As shown in FIG. 20, the ADF 10 conveys the idly-reversed documents G1 and G2 in the paper discharge direction while keeping the space between the document G1 and the document G2 at 0 mm, puts the third document G3 on standby in the OUT path 26, and feeds the fourth document G4 in the direction of the registration roller pair 14.

After the discharge of the document G1 is started in ACT 271, if the paper discharge sensor 57 is not turned on (No in ACT 272), the CPU 130 waits for a fixed time to elapse (Yes in ACT 273) and then determines that the document G1 causes a paper jam. After the discharge of the document G1 is started in ACT 271, if the paper discharge sensor 57 is turned on (Yes in ACT 272), the CPU 130 turns off the exit gate 53 and drives the paper discharge motor 77 (ACT 274).

The exit gate 53 continuously leads the documents G1 and G2 in the direction of the paper discharge path 54. The paper discharging and reversing roller pair 58 and the reversing and conveying roller pair 63 regularly rotate at high speed and continuously convey the documents G1 and G2 in the arrow f direction from the paper discharge path 54 to the paper discharge tray 51.

Figure 21:
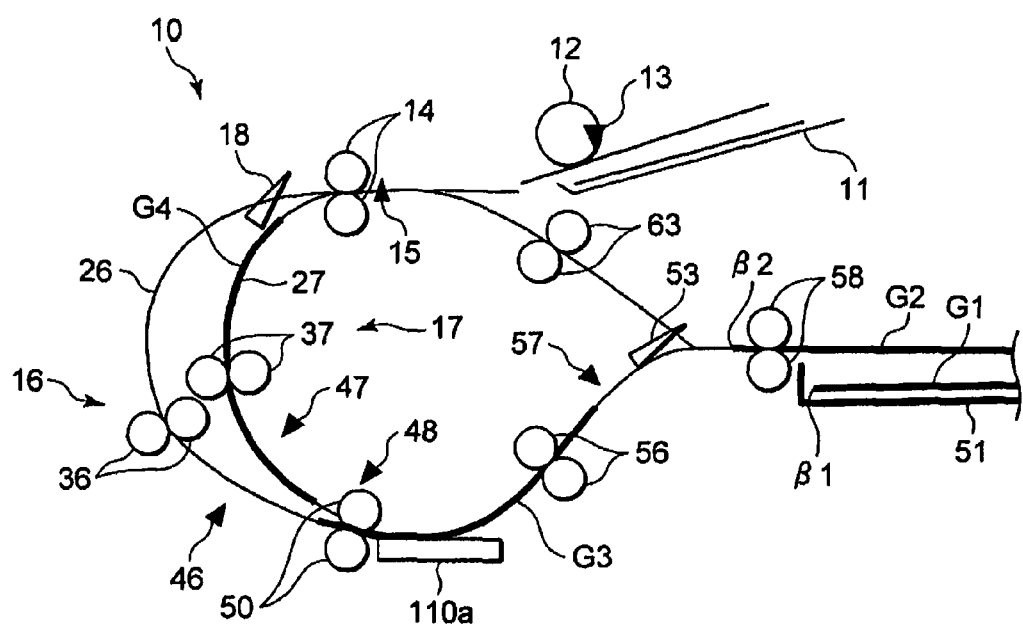
FIG. 21 is a diagram for explaining discharge of the documents G1 and G2 onto a paper discharge tray, image scanning for the front side of the document G3, and standby in the IN path of the document G4.

If the paper discharge sensor 57 is turned off (Yes in ACT 276), the CPU 130 determines whether a document is the last paper (ACT 277). If the document is not the last paper (No in ACT 277), the CPU 130 proceeds to ACT 220 and starts both-side image scanning for the documents G3 and G4. As shown in FIG. 21, the ADF 10 collects the documents G1 and G2 in the paper discharge tray 51 with the front sides thereof facing down and puts the fourth document G4 on standby in the IN Path 27 while an image on the front side of the third document G3 is scanned.

If the document is the last paper (Yes in ACT 277), the CPU 130 completes the conveyance of documents by the ADF 10 through ACTS 237 and 238.

If documents are equal to or smaller than the main size, the ADF 10 performs conveyance control for every two documents. For example, (1) the ADF 10 conveys the document G1 for front-side scanning. (2) The ADF 10 conveys the document G2 for front-side scanning. (3) The ADF 10 conveys the document G1 for rear-side scanning. (4) The ADF 10 conveys the document G2 for rear-side scanning. (5) The ADF 10 idly reverses and conveys the document G1. (6) The ADF 10 idly reverses and conveys the document G2. (7) The ADF 10 discharges the documents G1 and G2 while keeping the space between the document G1 and the document G2 at 0 mm. (8) In parallel to the discharge of the documents G1 and G2, the ADF 10 puts the document G3 on standby in the first conveying unit 16 and puts the document G4 on standby in the second conveying unit 17. (9) The ADF 10 conveys the documents G3 and G4 for front-side scanning in the same manner as the conveyance of the documents G1 and G2. (10) The ADF 10 discharges the documents G3 and G4 while keeping the space between the document G3 and the document G4 at 0 mm. (11) In parallel to the discharge of the documents G3 and G4, if there are the following documents, the ADF 10 conveys the following documents for front-side scanning for every two documents in the same manner as the conveyance of the documents G1 and G2 and the documents G3 and G4.

[Conveying Process for Documents Having Size Exceeding the Main Size]

If the size of documents exceeds the main size, for example, an operator inputs that the documents have large size from the control panel of the image forming apparatus. If the documents have the large size, the ADF 10 subjects the documents to conveyance control one by one.

For example, (20) the ADF 10 conveys the document G1 for front-side scanning. (21) The ADF 10 conveys the document G1 for rear-side scanning. (22) The ADF 10 idly reverses and conveys the document G1. (23) The ADF 10 discharges the document G1. (24) In parallel to the discharge of the document G1, the ADF 10 puts the document G2 on standby in the first conveying unit 16 or the second conveying unit 17 and conveys the document G2 for front-side scanning in the same manner as the conveyance of the document G1. (25) In parallel to the discharge of the document G2, if there are the following documents, the ADF 10 puts the following documents on standby in the first conveying unit 16 or the second conveying unit 17 and conveys one document for front-side scanning in the same manner as the conveyance of the document G1.

According to the embodiment, since the image scanning device 100 comprises the reversing and conveying unit 60 following the first conveying unit 16 and the second conveying unit 17, the image scanning device 100 scans both sides of a document with the one scanning device 112. In other words, images on both the sides of the document are scanned by a low-price image scanning device.

When the ADF 10 of the image scanning device 100 scans images on both sides of plural documents, if the size of the documents is equal to or smaller than the main size, the ADF 10 subjects the documents to conveyance control for every two documents. After scanning images on both sides of the two documents G1 and G2, the ADF 10 discharges, using the OUT path 26 and the IN path 27, the two documents G1 and G2 while keeping the space between the document G1 and the document G2 at 0 mm. In other words, during the both-side scanning, the documents are subjected to conveyance control at high speed by a low-price image scanning device comprising one scanning device. Consequently, productivity of both-side image scanning is improved.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. An auto document feeding device comprising:
    a document placing section on which documents are placed;
    a first gate configured to divert the documents in a first direction or a second direction;
    a first conveying unit configured to lead the documents diverted in the first direction to an image scanning unit;
    a second conveying unit configured to lead the documents diverted in the second direction to the image scanning unit;
    a paper discharge tray configured to collect the documents passed through the image scanning unit;
    a paper discharging and conveying unit configured to lead the documents from the image scanning unit in a direction of the paper discharge tray;
    a reversing roller configured to switch back the documents passed through the paper discharging and conveying unit;
    a reversing and conveying unit configured to convey the documents from the reversing roller to the first gate; and
    a second gate configured to divert the documents passed through the paper discharging and conveying unit to the reversing and conveying unit.

2. The device according to claim 1, wherein the first gate alternately diverts the documents in the first direction or the second direction.

3. The device according to claim 1, wherein
    the first conveying unit comprises a first path,
    the second conveying unit comprises a second path,
    the first path and the second path merge downstream in a conveying direction of the documents, and
    length of the first path and the second path from the first gate to a merging point is larger than length of a main-size document.

4. The device according to claim 1, wherein
    the reversing and conveying unit comprises a third path reaching from the second gate to the first gate, and
    length of the third path is larger than length of a main-size document.

5. The device according to claim 1, wherein, after sequentially conveying the documents to the image scanning unit in a scanning direction for a first side, the first conveying unit and the second conveying unit sequentially convey the documents, for which scanning of the first side finishes, to the image scanning unit in a scanning direction for a second side.

6. The device according to claim 5, wherein
    the first conveying unit conveys a first document to the image scanning unit in the scanning direction for the first side,
    the second conveying unit conveys, following the first document, a second document to the image scanning unit in the scanning direction for the first side,
    the discharging and conveying unit leads the first document in the direction of the paper discharge tray,
    the reversing roller switches back the first document,
    the reversing and conveying unit conveys the first document to the first gate,
    the discharging and conveying unit leads, following the first document, the second document in the direction of the paper discharge tray,
    the reversing roller switches back the second document,
    the reversing and conveying unit conveys the second document to the first gate,
    the first gate diverts the first document to the first conveying unit and diverts the second document to the second conveying unit,
    the first conveying unit conveys the first document to the image scanning unit in the scanning direction for the second side, and
    the second conveying unit conveys, following the first document, the second document to the image scanning unit in the scanning direction for the second side.

7. The device according to claim 1, wherein the first conveying unit and the second conveying unit sequentially convey two documents diverted to the first conveying unit and the second conveying unit after end of both-side scanning while keeping a space between the two documents at zero.

8. The device according to claim 7, wherein the first conveying unit and the second conveying unit convey the two documents diverted to the first conveying unit and the second conveying unit after the end of the both-side scanning while causing timing when a trailing end of the preceding document passes the image scanning unit and timing when a leading end of the following document reaches the image scanning unit to coincide with each other.

9. The device according to claim 7, wherein the first conveying unit and the second conveying unit convey the two documents diverted to the first conveying unit and the second conveying unit after the end of the both-side scanning at timing when a leading end of the following document overlaps a trailing end of the preceding document.

10. An image scanning device comprising:
an image scanning unit configured to scan images of documents;
a document placing section on which the documents fed to the image scanning unit are placed;
a first gate configured to divert the documents in a first direction or a second direction;
a first conveying unit configured to lead the documents diverted in the first direction to the image scanning unit;
a second conveying unit configured to lead the documents diverted in the second direction to the image scanning unit;
a paper discharge tray configured to collect the documents passed through the image scanning unit;
a paper discharging and conveying unit configured to lead the documents from the image scanning unit in a direction of the paper discharge tray;
a reversing roller configured to switch back the documents passed through the paper discharging and conveying unit;
a reversing and conveying unit configured to convey the documents from the reversing roller to the first gate; and
a second gate configured to divert the documents passed through the paper discharging and conveying unit to the reversing and conveying unit.

11. The device according to claim 10, wherein the first gate alternately diverts the documents in the first direction or the second direction.

12. The device according to claim 10, wherein
the first conveying unit comprises a first path,
the second conveying unit comprises a second path,
the first path and the second path merge downstream in a conveying direction of the documents, and
length of the first path and the second path from the first gate to a merging point is larger than length of a main-size document.

13. The device according to claim 10, wherein
the reversing and conveying unit comprises a third path reaching from the second gate to the first gate, and
length of the third path is larger than length of a main-size document.

14. The device according to claim 10, wherein, after sequentially conveying the documents to the image scanning unit in a scanning direction for a first side, the first conveying unit and the second conveying unit sequentially convey the documents, for which scanning of the first side finishes, to the image scanning unit in a scanning direction for a second side.

15. The device according to claim 14, wherein
the first conveying unit conveys a first document to the image scanning unit in the scanning direction for the first side,
the second conveying unit conveys, following the first document, a second document to the image scanning unit in the scanning direction for the first side,
the discharging and conveying unit leads the first document in the direction of the paper discharge tray,
the reversing roller switches back the first document,
the reversing and conveying unit conveys the first document to the first gate,
the discharging and conveying unit leads, following the first document, the second document in the direction of the paper discharge tray,
the reversing roller switches back the second document,
the reversing and conveying unit conveys the second document to the first gate,
the first gate diverts the first document to the first conveying unit and diverts the second document to the second conveying unit,
the first conveying unit conveys the first document to the image scanning unit in the scanning direction for the second side, and
the second conveying unit conveys, following the first document, the second document to the image scanning unit in the scanning direction for the second side.

16. The device according to claim 10, wherein the first conveying unit and the second conveying unit sequentially convey two documents diverted to the first conveying unit and the second conveying unit after end of both-side scanning while keeping a space between the two documents at zero.

17. The device according to claim 16, wherein the first conveying unit and the second conveying unit convey the two documents diverted to the first conveying unit and the second conveying unit after the end of the both-side scanning while causing timing when a trailing end of the preceding document passes the image scanning unit and timing when a leading end of the following document reaches the image scanning unit to coincide with each other.

18. The device according to claim 16, wherein the first conveying unit and the second conveying unit convey the two documents diverted to the first conveying unit and the second conveying unit after the end of the both-side scanning at timing when a leading end of the following document overlaps a trailing end of the preceding document.

19. A document feeding method comprising:
diverting continuously-fed documents to a first conveying unit or a second conveying unit;
conveying a diverted first document to an image scanning unit in a scanning direction for a first side;
conveying a diverted second document to the image scanning unit in the scanning direction for the first side following the first document;
leading the first document after end of scanning of the first side in a direction of a paper discharge tray;
switching back the first document led in the direction of the paper discharge tray and diverting the first document to the first conveying unit or the second conveying unit;
leading, when the switchback of the first document finishes, the second document after the end of the scanning of the first side in the direction of the paper discharge tray;
switching back the second document led in the direction of the paper discharge tray and diverting the second document to the first conveying unit or the second conveying unit;

conveying the first document, which is switched back and diverted to the first conveying unit or the second conveying unit, to the image scanning unit in a scanning direction for a second side; and conveying the second document, which is switched back and diverted to the first conveying unit or the second conveying unit, to the image scanning unit in the scanning direction for the second side following the first document.

20. The method according to claim 19, further comprising:

switching back the first document after end of both-side scanning from the direction of the paper discharge tray and diverting the first document to the first conveying unit or the second conveying unit;

switching back, when the switchback of the first document after the end of the both-side scanning finishes, the second document after the end of the both-side scanning from the direction of the paper discharge tray and diverting the second document to the first conveying unit or the second conveying unit;

conveying the first document, which is diverted to the first conveying unit or the second conveying unit after the end of the both-side scanning, to the paper discharge tray; and conveying the second document, which is diverted to the first conveying unit or the second conveying unit, after the end of the both-side scanning, to the paper discharge tray following the first document.

21. The method according to claim 20, wherein a space between the first document and the second document conveyed to the paper discharge tray after the end of the both-side scanning is set to zero.

22. The method according to claim 21, wherein a trailing end of the preceding first or second document and a leading end of the following first or second document reach the paper discharge tray at same timing.

23. The method according to claim 21, wherein the two documents are conveyed to the paper discharge tray with a leading end of the following first or second document placed on a trailing end of the preceding first or second document.

* * * * *